US008327060B2

(12) United States Patent
Heim

(10) Patent No.: US 8,327,060 B2
(45) Date of Patent: Dec. 4, 2012

(54) MECHANISM FOR LIVE MIGRATION OF VIRTUAL MACHINES WITH MEMORY OPTIMIZATIONS

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 446 days.

(21) Appl. No.: 12/627,929

(22) Filed: Nov. 30, 2009

(65) Prior Publication Data

US 2011/0131568 A1 Jun. 2, 2011

(51) Int. Cl.
G06F 12/00 (2006.01)

(52) U.S. Cl. .............................. 711/6; 711/165; 711/216

(58) Field of Classification Search .............. 711/6, 165, 711/216

See application file for complete search history.

(56) References Cited

U.S. PATENT DOCUMENTS

| 8,140,812 | B2 * | 3/2012 | Arroyo et al. ................. 711/170 |
| 2005/0268298 | A1 * | 12/2005 | Hunt et al. ........................ 718/1 |
| 2007/0130566 | A1 | 6/2007 | van Rietschote et al. |
| 2007/0169121 | A1 | 7/2007 | Hunt et al. |
| 2007/0214456 | A1 | 9/2007 | Casey et al. |
| 2007/0271560 | A1 | 11/2007 | Wahlert et al. |
| 2008/0184229 | A1 | 7/2008 | Rous et al. |
| 2008/0295096 | A1 | 11/2008 | Beaty et al. |
| 2009/0070771 | A1 | 3/2009 | Yuyitung et al. |
| 2010/0005465 | A1 | 1/2010 | Kawato |
| 2010/0050180 | A1 | 2/2010 | Amsterdam et al. |
| 2011/0004735 | A1 * | 1/2011 | Arroyo et al. ................. 711/162 |
| 2011/0131568 | A1 * | 6/2011 | Heim ................................. 718/1 |

OTHER PUBLICATIONS

U.S. Appl. No. 12/419,256, filed Apr. 2009, Frank.*
Galvin, Peter Baer, "VMware vSphere Vs. Microsoft Hyper-V: A Technical Analysis," Corporate Technologies, CTI Strategy White Paper, 2009, 32 Pages.
USPTO, Office Action for U.S. Appl. No. 12/627,943 mailed Mar. 19, 2012.
USPTO, Office Action for U.S. Appl. No. 12/627,950 mailed Mar. 22, 2012.

* cited by examiner

Primary Examiner — John Lane
(74) Attorney, Agent, or Firm — Lowenstein Sandler PC

(57) ABSTRACT

A mechanism for live migration of virtual machines (VMs) with memory optimizations is disclosed. A method of embodiments of the invention includes receiving a hash value for each of one or more memory pages of a migrating VM from a source host machine, obtaining a hash value for each of one or more memory pages hosted by a target host machine, and comparing the received hash values with the obtained hash values for matches. The method further comprises for each of the received hash values that do not match any of the obtained hash values, sending a negative acknowledgment to the source host machine for that hash value, and for each of the received hash values that do match any of the obtained hash values, using a memory page associated with the matching hash value at the target host machine for the migrating VM.

20 Claims, 5 Drawing Sheets

MECHANISM FOR LIVE MIGRATION OF VIRTUAL MACHINES WITH MEMORY OPTIMIZATIONS

RELATED APPLICATION

The present application is related to co-filed U.S. patent application Ser. No. 12/627,950 entitled "Mechanism for Shared Memory History Optimization in a Host Selection Algorithm for Virtual Machine Placement", which is assigned to the assignee of the present application.

TECHNICAL FIELD

The embodiments of the invention relate generally to virtual machine (VM) systems and, more specifically, relate to a mechanism for live migration of virtual machines with memory optimizations.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as VM operating systems. The VMM virtualizes the underlying hardware of the host machine or emulates hardware devices, making the use of the VM transparent to the VM operating system or the remote client that uses the VM.

In a virtualization systems, it is important to schedule (also referred to as selection or placement) VMs on the "best host" for the job. There are various considerations that play into a selection algorithm for selecting the "best host". The selection algorithm is relevant for both placement of the VM at launch time, and for live migration of the VM to another host. Live migration may be due to user request, or due to a trigger by a load balancing process causing the need to select a new host for the VM.

When performing live migration, there is usually a need to move several GB's of RAM from a source host machine to a target host machine. When both hosts are in a high speed LAN, there is less incentive to perform optimizations on this re-location. This is because there is no penalty for simply sending the entire information (memory) over the network. The time and resources it will take to perform the calculations required for the resources, and the additional latency to the migration process do not overcome the drawbacks of simply sending the memory pages over the high speed LAN. However, when network resources are a constraint, either due to high usage, multiple migrations occurring concurrently, or when trying to migrate between different sites that have low bandwidth or high latency, the benefits of optimizing the live migration process become evident.

VMs may run an operating system (OS) and processes with the same memory image as other VMs. In such a case, a host process may be used to optimize memory utilization on the host, by referencing identical memory pages from multiple VMs to the same single memory page. This is known as memory sharing. Memory sharing reduces the amount of memory required in the host when running VMs with shared memory.

Thus, a virtualization system would benefit from a live migration optimization based on memory sharing to handle situations when the network or other resources of the virtualization system are constrained.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
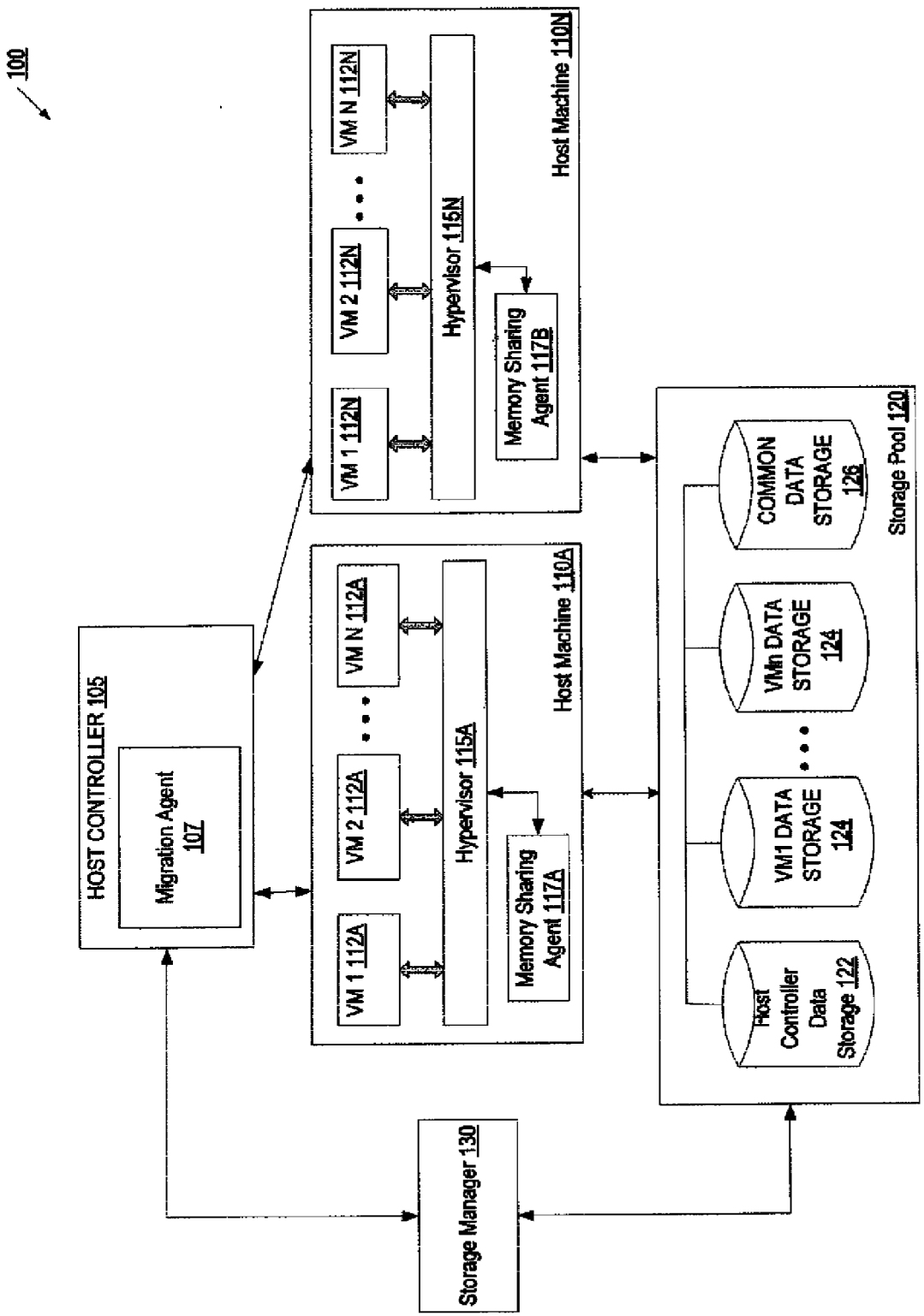
FIG. 1 is a block diagram of an exemplary virtualization architecture in which embodiments of the present invention may operate.

Embodiments of the invention provide a mechanism for live migration of virtual machines (VMs) with memory optimizations. A method of embodiments of the invention includes receiving a hash value for each of one or more memory pages of a migrating VM from a source host machine, obtaining a hash value for each of one or more memory pages hosted by a target host machine, and comparing the received hash values with the obtained hash values for matches. The method further comprises for each of the received hash values that do not match any of the obtained hash values, sending a negative acknowledgment to the source host machine for that hash value, and for each of the received hash values that do match any of the obtained hash values, using a memory page associated with the matching hash value at the target host machine for the migrating VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for live migration of VMs with memory optimizations. To implement a shared memory optimization, a live migration process should compare memory pages of a migrating VM with shared memory pages in a target host machine, which can be a time and resource-consuming process. Embodiments of the invention optimize the live migration process by passing a smaller amount of information used to compare and match a memory page of the migrating VM between the source and target host machines. Embodiments of the invention modify the live migration process by sending hashes of pages that are most likely to already exist on the target host and only sending the full memory pages on hashes that were rejected by the target host as not having a match.

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a VM operating system (OS) that may be different from one another. The VM OS may include Microsoft Windows, Linux, Solaris, Mac OS, etc. The host 110A, 110N may include a hypervisor 115A, 1125N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124 designated for individual VMs 112A, 112N. When a VM 112A, 112N is created, it is associated with its own individual data storage 124, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In one embodiment, host controller 105 may include a migration agent 107 that is responsible for making a determination of which host machine 110A, 110N to place a VM 112A, 112N when it is migrated. In the following description, a host machine 110A, 110N that a migrating VM is leaving is known as a "source host", while a host machine that the migrating VM is being placed at is known as a "target host." For purposes of the following explanation, assume that host machine 110A is a source host, while host machine 110N is a target host. In virtualization system 100, it is important to schedule (also referred to as selection or placement) VMs on the "best target host" for the job. There are various considerations for selecting the "best target host". In one embodiment, migration agent 107 utilizes a general selection algorithm that considers a variety of factors for placement of a VM. Utilizing this general selection algorithm, the migration agent 107 selects the target host machine 110N to receive a migrating VM 112A from a source host machine 110A.

In many cases, a migrating VM 112A may run an OS and processes that utilize the same memory image as other VMs. In such cases, a process of the target host machine 110N may be used to optimize memory utilization on the host, by referencing identical memory pages from multiple VMs to the same single memory page. This is known as memory sharing.

In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 11N storing identical memory pages in their separate data storage 122, the memory sharing agent 117A, 117N can identify these shared pages and store one copy of these memory pages in the common data storage 124 that may be accessed by each VM 112A, 112N. Memory sharing reduces the amount of memory required in the host machine 110A, 110N when running VMs with shared memory.

Embodiments of the invention optimize the live migration process that utilizes a shared memory optimization. A shared memory optimization for live migration compares memory pages of the migrating VM 112A with memory pages on the target host machine 110N and will only transfer those memory pages from the migrating VM 112A that are not on the target host machine 110N. To implement the shared memory optimization, the live migration process will have to compare memory pages of the migrating VM 112A with memory pages in the target host 112N, which can be a time and resource-consuming process.

Embodiments of the invention optimize the live migration process by passing a smaller amount of information used to compare and match a memory page of the migrating VM 112A between the source 110A and target 110N host machines. Specifically, embodiments of the invention modify the live migration process by sending hashes of pages that are most likely to already exist on the target host 110N, and only sending the full memory pages on hashes that were rejected by the target host 110N as not having a match.

While a hash does not guarantee equality of the pages, with a good hash the chances become very low for inequality of pages (sometimes lower than the chances of a random calculation error by physical hardware). Chances of inequality of pages are also lower when comparing pages already detected to be shared between VMs of same OS by a previous shared memory optimization.

To start the optimized migration process of embodiments of the invention, the migration agent 107 initially becomes aware of a VM 112A to be migrated. In one embodiment, the migration agent 107 may receive notification about the VM to be migrated. In other embodiments, the migration agent 107 may itself monitor the virtualization system 100 to identify when a VM 112A should be migrated. It is at this point that the migration agent 107 selects a target host machine 110N to receive the migrating VM 112A by utilizing a general host selection algorithm.

Once the target host machine 110N has been selected, the migration agent 107 calculates hash values for all of the memory pages of the migrating VM 112A as part of the optimization of the migration process by embodiments of the invention. In some embodiments, the hash values of the memory pages may already be calculated and stored in data storage pool 120 and/or in host controller 105.

In one embodiment, the source host 110A may calculate and send the hashes of all of the migrating VM 112A memory pages. However, in other embodiments, because there is a higher chance of memory pages being found on the target host 110N if they are pages shared between multiple VMs of the same characteristics, the source host 110A may only send those memory pages that are shared with other VMs 112A on the source host 110A. In some embodiments, the hashes may be sent for all VM memory pages shared with other VMs 112A in the source host 110A, or even only for pages which are shared by more than N VMs 112A.

In the live migration process, there are typically several cycles of sending pages to the target host 110N, as pages continue changing while the migration is occurring (i.e., as the VM is still "alive"). Some embodiments of the invention may only send hashes on no more than the first (or possibly second) cycles. This is because the calculation of hashes and their exchange with the target host 110N may add a latency that may cause the migration process to take more time, in which more memory pages may change. In addition, there is a higher chance that shared memory pages will be the ones always found in a VM, rather than those changing all the time (although there are cases this is not true, say, if a user just opened an application shared by all VMs on the target host as well).

Furthermore, to further optimize the live migration of shared memory pages, embodiments of the invention may stop calculating and sending hashes if more than 'X'% of the memory page hashes sent to the target host 110N were rejected by the target host 110N. Such rejection indicates that the shared memory optimization was not optimal for the cycle (and hence is probably not going to contribute to future cycles) and should be discontinued.

On the other side of the optimized live migration process of embodiments of the invention, the target host machine 110N consumes the list of hashes sent from the source host 110A to compare to hashes of the memory pages of the target host 110N. In some embodiments, the target host 110N may already have a repository of shared memory pages of its running VMs. In such a case, the target host 110N utilizes its memory sharing agent 117N to aid in obtaining the memory page hash calculations.

Figure 2:
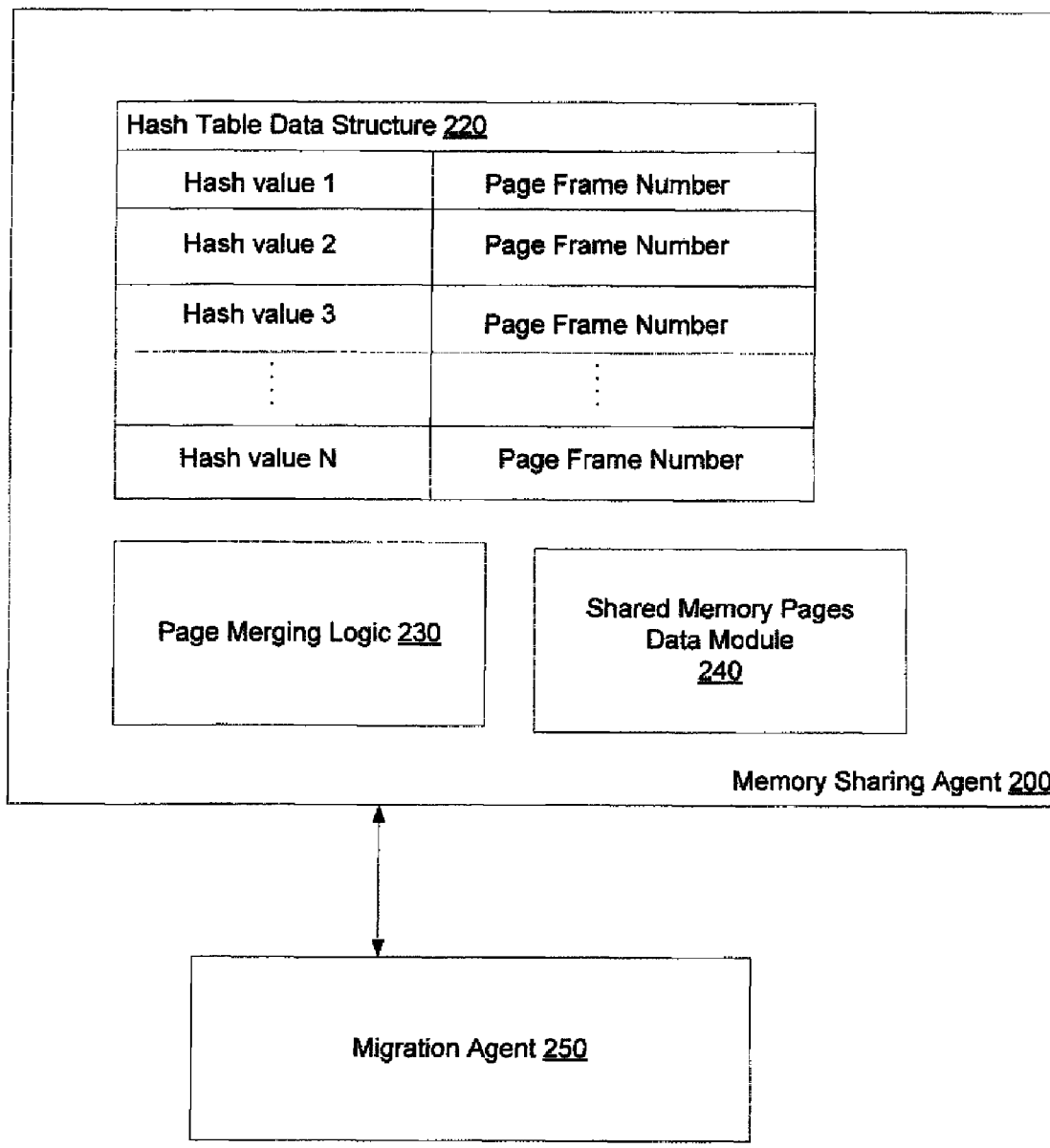
FIG. 2 is a block diagram of a memory sharing agent according to an embodiment of the invention.

FIG. 2 is a block diagram illustrating a closer view of a memory sharing agent utilized as part of the optimized live migration of embodiments of the invention. In one embodiment, memory sharing agent 200 is the same as memory sharing agent 117A, 117N described with respect to FIG. 1. As shown, memory sharing agent 200 is communicably coupled to migration agent 250. In one embodiment, migration agent 250 is the same a migration agent 107 described with respect to FIG. 1.

Memory sharing agent 200 includes a hash table data structure 220, page merging module 230, and shared memory pages data 240. The page merging logic 230 searches for and identifies identical memory pages of VMs associated with the memory sharing agent. The page merging logic 230 utilizes the hash table data structure 220 in order to find identical memory pages in an effective way. The hash table data structure 220 holds page frame numbers and is accessed by hash values of those pages. Utilizing the hash values, the merging logic 230 can identify identical memory pages and ensure that only one copy of that page is stored at a host machine, while also ensuring that disparate accesses to that memory page all are directed to the one single source of the memory page. In one embodiment, data about shared memory pages may be stored in a shared memory pages data module 240.

One skilled in the art will appreciate that memory sharing agent 200 is just exemplary implementation. Other implementations of memory sharing agent may be utilized in embodiments of the invention, such as one using a tree structure to track shared memory pages, for example.

Returning to the discussion of the optimized live migration process of embodiments of the invention, the memory sharing agent 117A, 117N may be utilized to provide hashes of memory pages of the target host machine 110N. However, if a shared memory repository is not being used, or is being used but does not facilitate easy detection of shared pages, the hashes of shared memory pages may be calculated on the target host 110N specifically for the purpose of the live migration. In this case, the target host 110N calculates the hashes of memory pages of currently running VMs, as the base for comparison with the hashes sent from the source host machine 110A.

In some embodiments, the hash calculations by the target host machine 110N may be done for all VMs 112N in the target host, VMs with similar characteristics, and/or only VMs with a large enough history of sharing with the migrating VM 112A. Similarly, hashes may be kept for all scanned pages, or only for those that are found in more than one VM, indicating they are likely to be shared by the migrating VM 112A as well.

Once the hashes of the memory pages on the target host 110N are obtained, the target host 110N may then compare the hashes sent from the source host 110A with the hashes of its own memory pages and inform the source host which memory pages should be sent in full to the target host 110N. In one embodiment, the target host 110N may send a negative acknowledgement (NACK) to the source host on any hashes that do not match its own list of hashes. The source host will then know to send the full memory page for that hash.

Embodiments of the invention may further optimize the live migration process by detecting duplicate pages in one or more migrating VMs and ensuring that these duplicate pages are not sent to the target host machine 110N. In the case of the migration of a single VM 112A, some memory pages may be duplicate within the VM itself. The optimized live migration process of embodiments of the invention utilizes the calculation of hashes by the source host 110N as part of the optimized live migration of embodiments of the invention.

Specifically, the source host 110A compares each calculated hash to previously-calculated hashes to identify any matches. If a memory page matches a page already sent, then the migration process on the source host 110A sends the target host 110N a note to re-use the same page that was sent earlier instead of sending the duplicate page. In some embodiments, this note may be an ordinal of the previously-sent page. In some embodiments, if a matching hash value is found, then the source host 110N may further compare the actual memory pages to be certain that they are equal.

In the case of a bulk migration of multiple VMs 112A from the source host 110A, a similar process as the single VM migration duplicate page check is performed. The exception is that the comparison would be treated as a single process for more than one VM, thereby allowing the migration process to only send a memory page that exists in more than one VM once.

Figure 3:
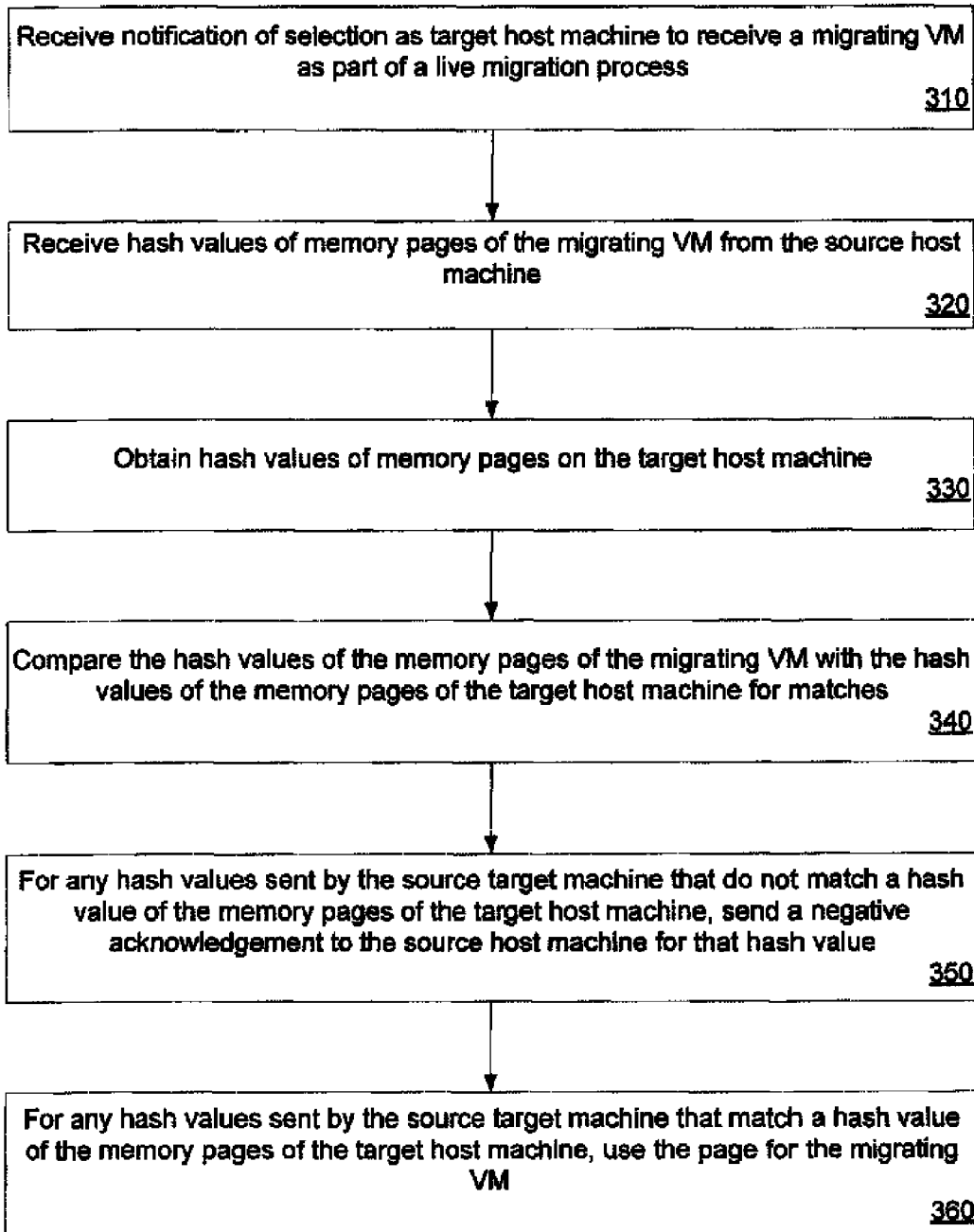
FIG. 3 is a flow diagram illustrating a method for optimized live migration based on memory page hash calculation comparison according to an embodiment of the invention.

FIG. 3 is a flow diagram illustrating a method 300 for optimized live migration based on memory page hash calculation comparison according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by target host machine 110N described with respect to FIG. 1.

Method 300 begins at block 310 where notification is received of selection as a target host machine to receive a migrating VM as part of a live migration process. In one embodiment, this notification is sent by a migration agent overseeing the live migration process. Then, at block 320, hash values of memory pages of the migrating VM are received from a source host machine of the migrating VM. In one embodiment, this occurs for each cycle of the live migration process, as the migrating VM memory pages are continually changing. In another embodiment, hash values are only sent for those memory pages of the migrating VM that are candidates for a shared memory optimization with the target host machine. These memory pages are notated as such for the target host machine.

At block 330, hash values of memory pages at the target host machine are obtained. In one embodiment, the target host machine obtains these hash values from a memory sharing agent associated with the target host machine. In another embodiment, the target host machine calculates the values itself for the purposes of the live migration. Then, at block 340, the received hash values from the source host machine are compared for matches to the obtained hash values of the memory pages of the target host machine.

For any hash values sent by the source host machine that do not match a hash value of the memory pages of the target host machine, the target host machines sends a negative acknowledgement associated with that hash value to the source target machine at block 350. Based on this, the source host machine knows to send the full memory page to the target host machine. On the other hand, for any hash values sent by the source host machine that match a hash value of the memory pages of the target host machine, then the target host machine uses the memory page on the target host machine associated with the matching hash value for the migrating VM at block 360. At this point, the live migration process may continue on as discussed above.

Figure 4:
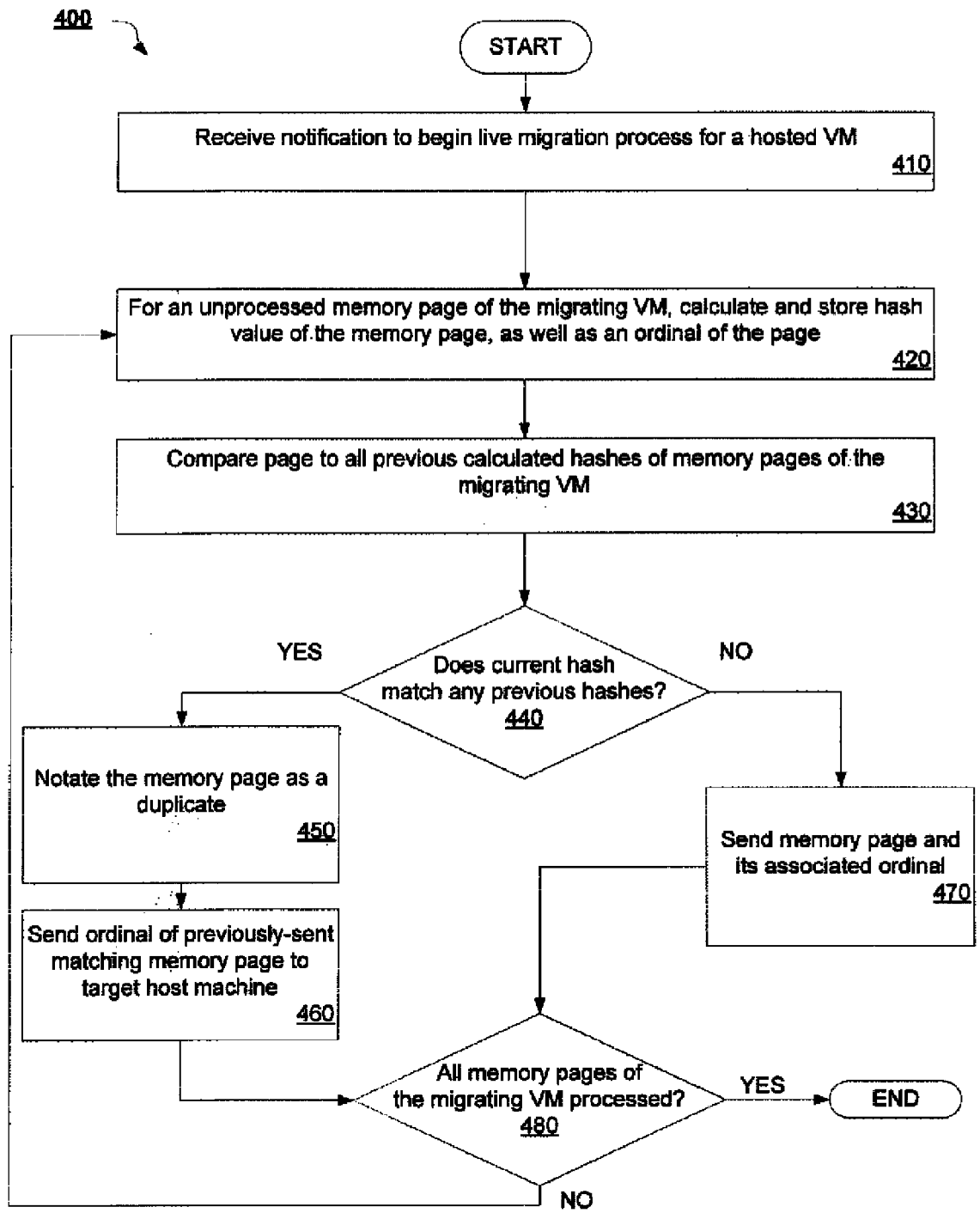
FIG. 4 is a flow diagram illustrating a method for optimized live migration by detecting duplicate memory pages according to an embodiment of the invention.

FIG. 4 is a flow diagram illustrating a method 400 for optimized live migration by detecting duplicate memory pages according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by source host machine 110A described with respect to FIG. 1. In one embodiment, method 400 may be performed in conjunction with method 300 described with respect to FIG. 3, or individually.

Method 400 begins at block 410 where notification to begin a live migration of a hosted VM is received. In one embodiment, this notification may be received from a migration agent of a host controller managing a source host machine that received the notification. Then, at block 420, for any unprocessed memory page (in terms of the optimized migration of embodiments of the invention) of the migrating VM, a hash value of that memory page is calculated and stored. In addition, an ordinal of that memory page is also determined and stored. At block 430, the memory page is compared to all previous calculated hashes of memory pages of the migrating VM.

Then, at decision block 440, it is determined whether the calculated hash matches any of the previous hash values. If so, then the memory page is notated as a duplicate at the source host machine at block 450. In addition, the ordinal of the previously-sent matching memory page is sent to the target host machine at block 460. In one embodiment, the target host machine keeps a map between ordinals of pages received and the pages in the migrating VM. When the target host machine receives a notation that an ordinal is sent (instead of a full page), it will fetch the actual memory page from itself (e.g., from the migrating VM already at the target host machine). If the calculated hash does not match any of the previous hash values at decision block 440, then the full memory page and its associate ordinal is sent to the target host machine at block 470.

At decision block 480, it is determined whether all memory pages of the migrating VM have been processed. If not, then the method 400 returns to block 420 to continue processing memory pages of the migrating VM. On the other hand, if all memory pages have been processed, then method 400 ends and the live migration process continues from there.

In some embodiments, method 400 may be performed on multiple VMs of a bulk migration to determine duplicate memory pages between the VMs and avoid having to send multiple copies of the same memory page.

Figure 5:
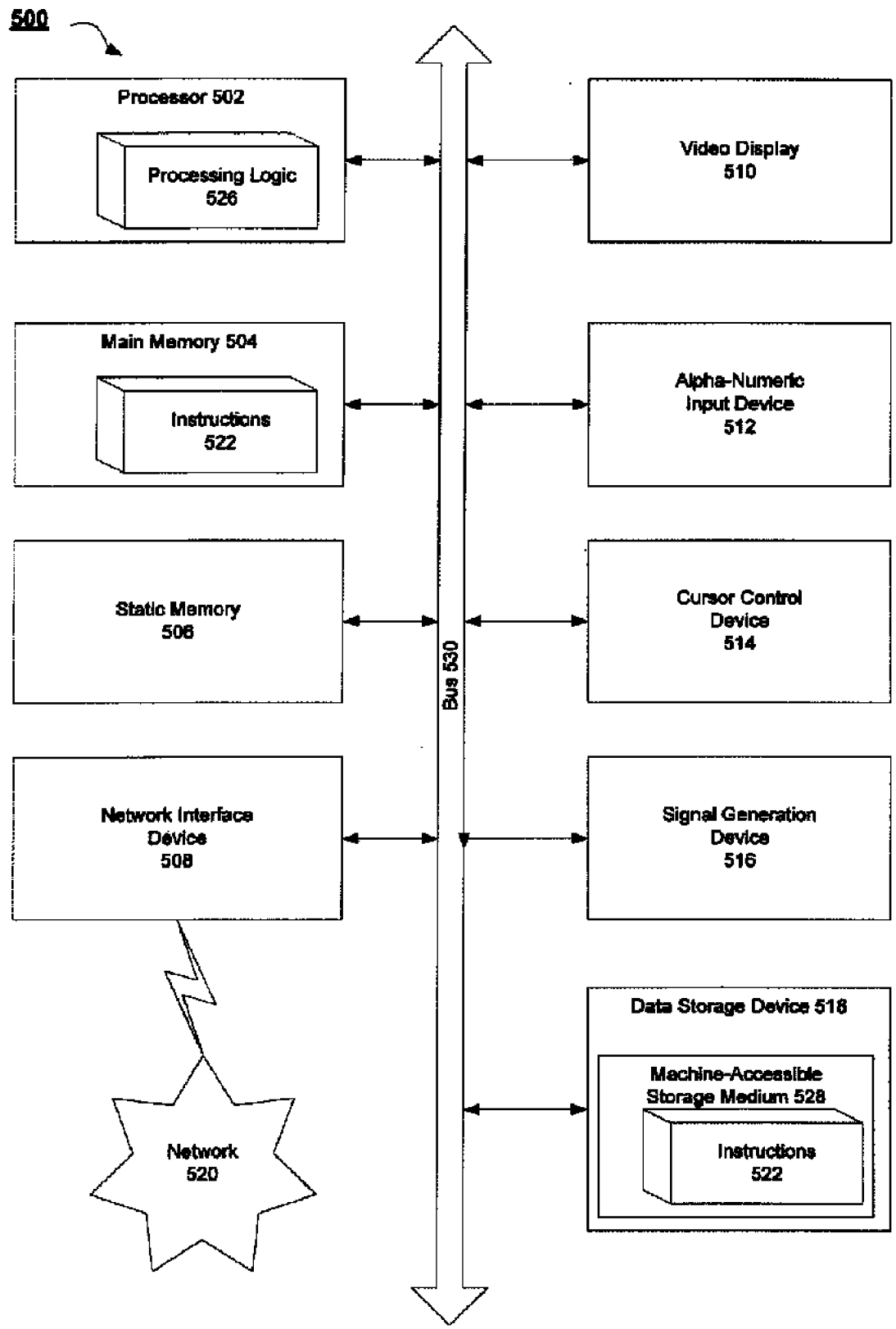
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform live migration of VMs with memory optimizations by a migration agent 107 as described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform live migration of VMs with memory optimizations of methods 300 and 400 described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
receiving, by a target host machine, a hash value for each of one or more memory pages of a migrating virtual machine (VM) from a source host machine;
obtaining, by the target host machine, a hash value for each of one or more memory pages hosted by the target host machine; and
for each of the received hash values from the source host machine that match any of the obtained hash values from the target host machine, using, by the target host machine, a memory page associated with the matching hash value at the target host machine for the migrating VM.

2. The method of claim 1, wherein the hash values for the one or more memory pages hosted by the target host machine are maintained by a memory sharing agent at the target host machine.

3. The method of claim 2, wherein the memory sharing agent includes a hash table data structure that stores the hash values for the one or more memory pages of the target host machine and a shared memory pages data module that stores data on which memory pages of the target host machine are shared between VMs hosted by the target host machine.

4. The method of claim 1, further comprising:
receiving, at the target host machine, an ordinal of a previously-sent memory page from the source host machine;
referencing, by the target host machine, a map correlating ordinals of memory pages received from the source host machine and memory pages of the migrating VM now on the target host machine to determine a memory page on the target host machine associated with the received ordinal; and
fetching, by the target host machine, the determined memory page from the migrating VM already at the target host machine.

5. The method of claim 4, wherein the ordinal of the previously-sent memory page is sent from the source host machine when the source host machine determines that a hash of another memory page of the migrating VM to be sent to the target host machine matches a hash of the memory page referenced by the ordinal.

6. The method of claim 5, wherein the ordinal of the previously-sent memory page is sent from the source host machine when the source host machine determines that a hash of another memory page of any of one or more other migrating VMs to be sent to the target host machine matches a hash of the memory page referenced by the ordinal.

7. The method of claim 1, wherein the one or more memory pages of the source host machine include memory pages of the source host machine that are shared between multiple VMs on the source host machine.

8. The method of claim 1, wherein the comparing the received hash values with the obtained hash values is terminated if more than a predetermined percentage of the received hashes sent to the target host machine do not match the obtained hash values.

9. A system, comprising:
a memory;
a processing device communicably coupled to the memory; and
a memory sharing agent executable from the memory and by the processing device, the memory sharing agent configured to:
receive a hash value for each of one or more memory pages of a migrating virtual machine (VM) from a source host machine;
obtain a hash value for each of one or more memory pages managed by the memory sharing agent; and
for each of the received hash values from the source host machine that match any of the obtained hash values from the memory sharing agent, use a memory page associated with the matching hash value at a target host machine of the memory sharing agent for the migrating VM.

10. The system of claim 9, wherein the memory sharing agent includes a hash table data structure that stores the hash values for the one or more memory pages of the target host machine and a shared memory pages data module that stores data on which memory pages of the target host machine are shared between VMs hosted by the target host machine.

11. The system of claim 9, wherein the memory sharing agent further configured to:
receive an ordinal of a previously-sent memory page from the source host machine;
reference a map correlating ordinals of memory pages received from the source host machine and memory pages of the migrating VM now on the target host machine to determine a memory page on the target host machine associated with the received ordinal; and
fetch the determined memory page from the migrating VM already at the target host machine.

12. The system of claim 11, wherein the ordinal of the previously-sent memory page is sent from the source host machine when the source host machine determines that a hash of another memory page of the migrating VM to be sent to the target host machine matches a hash of the memory page referenced by the ordinal.

13. The system of claim 12, wherein the ordinal of the previously-sent memory page is sent from the source host machine when the source host machine determines that a hash of another memory page of any of one or more other migrating VMs to be sent to the target host machine matches a hash of the memory page referenced by the ordinal.

14. The system of claim 9, wherein the one or more memory pages of the source host machine include memory pages of the source host machine that are shared between multiple VMs on the source host machine.

15. The system of claim 9, wherein the comparing the received hash values with the obtained hash values is terminated if more than a predetermined percentage of the received hashes sent to the target host machine do not match the obtained hash values.

16. A non-transitory machine-readable storage medium including data that, when accessed by a processing device, cause the processing device to perform operations comprising:
receiving, by the processing device, a hash value for each of one or more memory pages of a migrating virtual machine (VM) from a source host machine;
obtaining, by the processing device, a hash value for each of one or more memory pages hosted by a target host machine; and
for each of the received hash values from the source host machine that match any of the obtained hash values from the target host machine, using, by the processing device, a memory page associated with the matching hash value at the target host machine for the migrating VM.

17. The non-transitory machine-readable storage medium of claim 16, wherein the hash values for the one or more memory pages hosted by the target host machine are maintained by a memory sharing agent at the target host machine.

18. The non-transitory machine-readable storage medium of claim 17, wherein the memory sharing agent includes a hash table data structure that stores the hash values for the one or more memory pages of the target host machine and a shared memory pages data module that stores data on which memory pages of the target host machine are shared between VMs hosted by the target host machine.

19. The non-transitory machine-readable storage medium of claim 16, wherein the machine-readable storage medium includes data that, when accessed by the machine, cause the machine to perform operations further comprising:

receiving an ordinal of a previously-sent memory page from the source host machine;

referencing a map correlating ordinals of memory pages received from the source host machine and memory pages of the migrating VM now on the target host machine to determine a memory page on the target host machine associated with the received ordinal; and fetching the determined memory page from the migrating VM already at the target host machine.

20. The non-transitory machine-readable storage medium of claim 16, wherein the comparing the received hash values with the obtained hash values is terminated if more than a predetermined percentage of the received hashes sent to the target host machine do not match the obtained hash values.

* * * * *